United States Patent [19]
Gunderson

[11] Patent Number: 5,960,989
[45] Date of Patent: Oct. 5, 1999

[54] LID DISPENSER WITH DIAL ADJUSTMENT AND PIVOTING ACCESS DOOR

[75] Inventor: Jeffrey E. Gunderson, Stoughton, Wis.

[73] Assignee: Acry Fab, Inc., Sun Prairie, Wis.

[21] Appl. No.: 08/949,135

[22] Filed: Oct. 10, 1997

Related U.S. Application Data

[60] Provisional application No. 60/028,477, Oct. 15, 1996.

[51] Int. Cl.$^6$ .................................................. B65G 59/00
[52] U.S. Cl. .......................... 221/220; 221/229; 221/242; 221/255; 221/279
[58] Field of Search ..................................... 221/220, 222, 221/223, 227, 229, 241, 242, 255, 256, 279, 312, 297; 312/43, 45

[56] References Cited

U.S. PATENT DOCUMENTS

| | | | |
|---|---|---|---|
| 1,083,727 | 1/1914 | Claussen | 221/221 |
| 1,261,950 | 4/1918 | Luellen | 221/221 |
| 1,593,717 | 7/1926 | Frick | 221/223 |
| 1,636,208 | 7/1927 | Bergmann | 221/223 |
| 1,660,247 | 2/1928 | Wooten et al. | 221/261 |
| 2,539,652 | 1/1951 | Amberg et al. | 221/251 |
| 2,946,480 | 7/1960 | Farber | 221/106 |
| 3,904,077 | 9/1975 | Luginbuhl | 221/175 |
| 3,906,703 | 9/1975 | Heisler | 53/42 |
| 4,033,478 | 7/1977 | House | 221/279 |
| 4,243,153 | 1/1981 | Mitchell | 221/34 |
| 4,741,458 | 5/1988 | Odorici | 221/221 |
| 4,854,479 | 8/1989 | Callahan et al. | 221/241 |
| 4,949,526 | 8/1990 | Brogna et al. | 53/306 |
| 5,000,345 | 3/1991 | Brogna et al. | 221/221 |
| 5,012,952 | 5/1991 | Franz | 221/36 |
| 5,038,969 | 8/1991 | Berger | 221/40 |
| 5,131,562 | 7/1992 | Brown | 221/41 |
| 5,135,136 | 8/1992 | Moore | 221/241 |
| 5,154,315 | 10/1992 | Dominico et al. | 221/11 |
| 5,322,188 | 6/1994 | Dodaro | 221/223 |
| 5,328,052 | 7/1994 | Kizilos | 221/42 |
| 5,383,571 | 1/1995 | Gunderson | 221/223 |
| 5,518,149 | 5/1996 | Lotspeich et al. | 221/222 |
| 5,529,210 | 6/1996 | Cooper | 221/223 |
| 5,788,116 | 8/1998 | Bednar | 221/222 |

FOREIGN PATENT DOCUMENTS

| | | | |
|---|---|---|---|
| 1962 943 | 6/1997 | Germany | 221/242 |

*Primary Examiner*—H. Grant Skaggs
*Attorney, Agent, or Firm*—Lathrop & Clark LLP

[57] ABSTRACT

The lid dispenser of the present invention has four rods which extend from the front to the rear and which support and guide the lids. The rods are connected at the front to individual lid dispensing pagers, and are supported at the rear in arcuate tracks in an adjustment ring. The front pagers are also mounted in an adjustment ring with arcuate tracks. Both adjustment rings have serrated or ridged cylindrical edges, which allow the click-positioning of the rings at a desired position to force the rods and pagers into an evenly spaced radial position. Three plastic claws are flexibly supported on a support member which is mounted for front-to-back movement on cover guide rods. Each claw member is connected by flexible bands to positionable fasteners which are fixed in radial slots in the support member which allow some radial movement of the claws as they engage a cover. By use of such a dispenser in convenience stores and the like contact by customers with lids other than those dispensed is avoided.

16 Claims, 2 Drawing Sheets

LID DISPENSER WITH DIAL ADJUSTMENT AND PIVOTING ACCESS DOOR

RELATED APPLICATION

This application claims the benefit of U.S. Provisional Patent Application No. 60/028,477, filed Oct. 15, 1996, the disclosure of which is incorporated by reference herein.

FIELD OF THE INVENTION

This invention relates to apparatus for dispensing articles in general, and in particular to an apparatus for dispensing individual beverage container lids which is adjustable for a variety of lid sizes.

BACKGROUND OF THE INVENTION

Untended selection of goods is increasingly popular with consumers. From petroleum to food products, purchasers appreciate the immediate satisfaction and lowered cost provided by self-service. Many convenience stores and restaurants provide cafeteria line or serve-yourself type vending of prepared food, often for take-out or on-the-road consumption. Beverages dispensed from a fountain are typically served in paper or plastic cups, which, to prevent spilling, are provided with molded plastic lids. These lids have a resilient flange which snaps into engagement with a bead formed in the lip of the beverage container. Individual cup dispensers have long been available which permit the removal of a single cup without contamination or disturbance of the remaining supply. Container lids, however, differ from cups in that no deep graspable surface is provided.

In order to prevent unnecessary handling of the lid supply, especially where multiple users are drawing on the supply, a dispenser should isolate the supply of lids from the single lid dispensed. Furthermore, to reduce litter and waste, it is desirable that a dispenser dispense only one lid at a time, a goal complicated by the fact that the resilient plastic lids have a tendency to stick together.

In my prior U.S. Pat. No. 5,383,571, the disclosure of which is incorporated by reference herein, I disclosed a convenient, universal lid dispenser which was adjustable to suit most thermoformed lids in common use. Nonetheless, harried users of dispensing equipment prefer a unit which can be rapidly configured to different size lids without the need for tools.

What is needed is a compact lid dispenser which repeatably dispenses single lids from a supply which is shielded from casual contact with users and which is quick and easy to adjust for different size lids.

SUMMARY OF THE INVENTION

The lid dispenser of the present invention has four rods which extend from the front to the rear and which hold the lids thereon. The rods are connected at the front to individual lid dispensing pagers, and at the rear engage with arcuate tracks in an adjustment ring. The front pagers are also mounted in an adjustment ring with arcuate tracks. Both adjustment rings have serrated or ridged cylindrical edges, which allow the click-positioning of the rings at a desired position to force the rods and pagers into an evenly spaced radial position. Three plastic claws are flexibly supported on a door which is pivotably mounted to the housing. Each claw member is connected by flexible bands to positionable fasteners which are fixed in radial slots in the door which allow some radial movement of the claws as they engage a cover. Depth stops extend from the claws and position them with respect to the frontmost lid of the stack. A user may pivot the door open by pulling on a handle, to thereby engage a single lid which is presented for upward removal by the user. By use of such a dispenser in convenience stores and the like, casual contact by customers with lids other than those dispensed is avoided. To load a stack of lids, tabs on the door are pushed inwardly to allow the door to be pivoted fully out of the way of the housing storage tube. A stack of lids may then be fully inserted, and the door closed.

It is an object of the present invention to provide a dispenser for beverage container lids which dispenses a single lid without contamination of the lid supply by contact with a user's hands.

It is another object of the present invention to provide a lid dispenser which dispenses single lids in response to the pivoting of a door.

It is also an object of the present invention to provide a lid dispenser which may be loaded through the same opening as lids are dispensed.

It is a further object of the present invention to provide a lid dispenser which will repeatedly dispense lids untended and with minimal maintenance.

It is another object of the present invention to provide a lid dispenser which can be rapidly adjusted without the need for tools.

Further objects, features, and advantages of the invention will be apparent from the following detailed description when taken in conjunction with the accompanying drawings.

DESCRIPTION OF THE PREFERRED EMBODIMENTS

Figure 1:
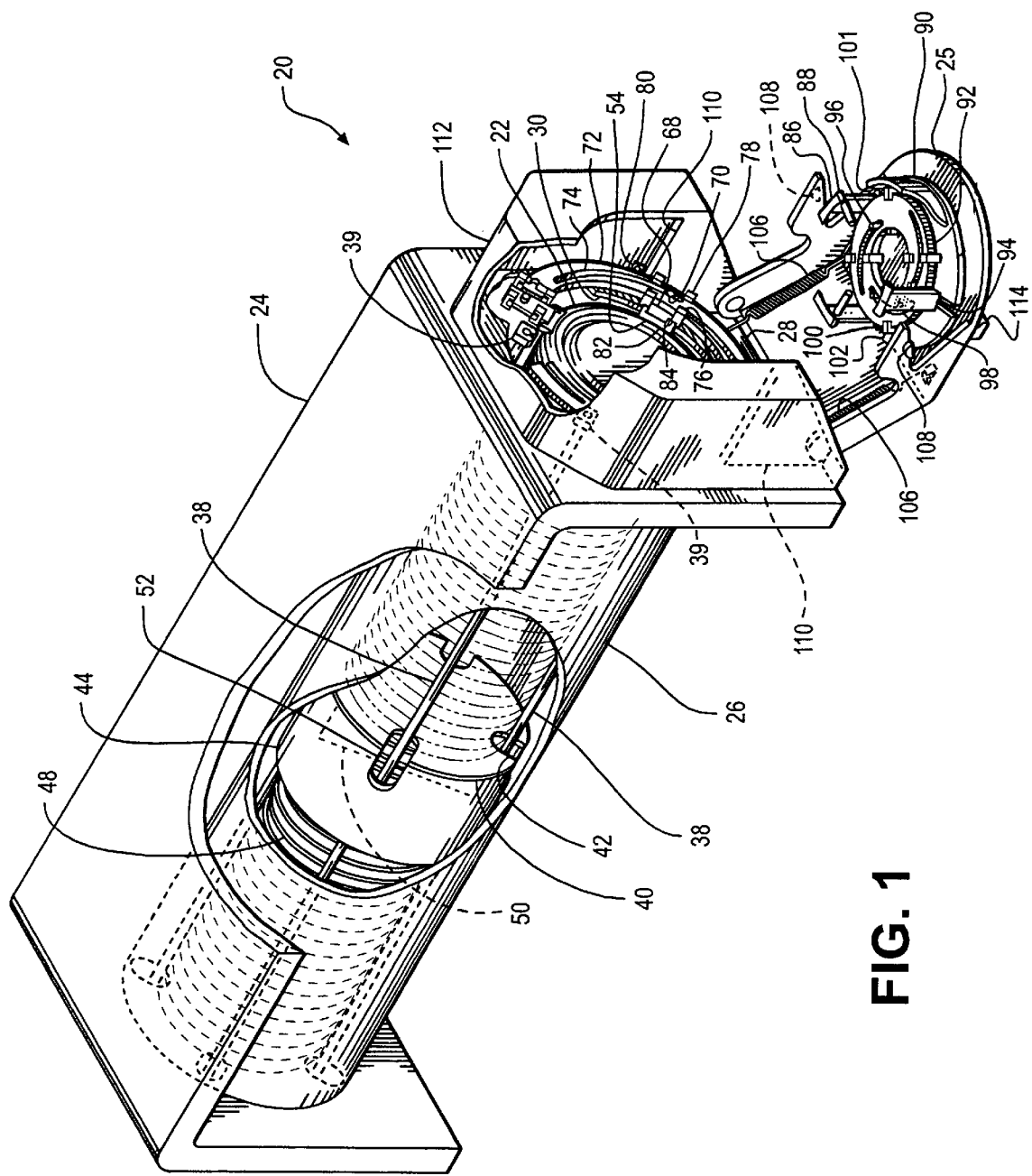
FIG. 1 is a front perspective view, partially broken away, of the lid dispenser of this invention.
Figure 2:
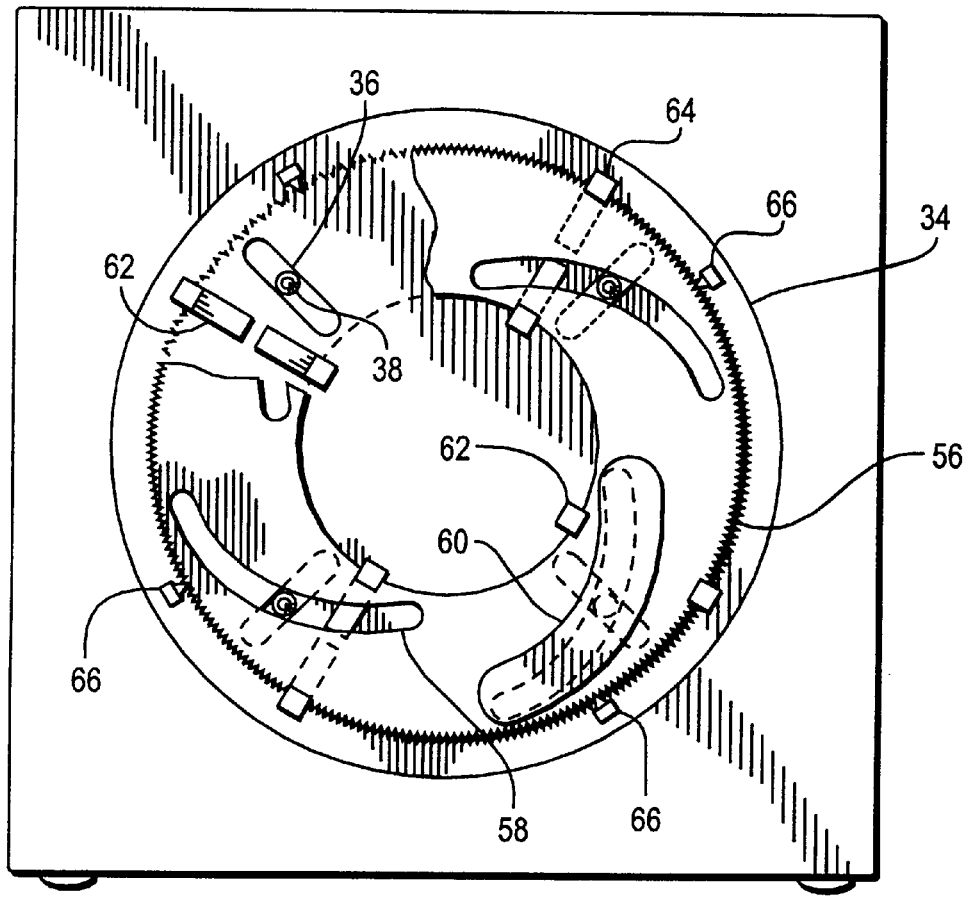
FIG. 2 is a rear elevational view of the lid dispenser of FIG. 1.
Figure 3:
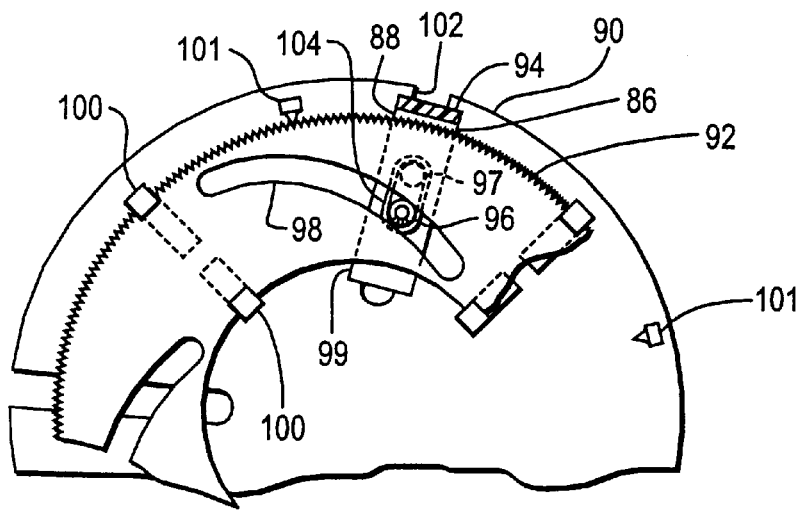
FIG. 3 is a fragmentary plan view, partially broken away, of the lid extractor claw assembly of the lid dispenser of FIG. 1.

Referring more particularly to FIGS. 1–3 wherein like numbers refer to similar parts, a lid dispenser 20 is shown in FIG. 1. The dispenser 20 is configured to repeatably dispense individual flanged container lids 22 on the demand of a user in such a way that each user touches need only touch the dispensed lid. The dispenser 20 may be adjusted and reconfigured to accept and dispense lids of varying dimensions. The user need only pivot a door 25 frontwardly to have access to a lid 22.

The dispenser 20 has a box-like housing 24 which may be positioned on a counter or mounted within a cabinet. A cylindrical lid supply tube 26 is fixed within the housing 24 rearward of the housing front wall 28. The housing front wall defines a circular lid dispensing opening 30 through which dispensed lids are discharged from the supply tube 26. The housing supply tube 26 has a rear wall 34 with four radial slots 36 which engage four one-quarter inch diameter stainless steel lid support rods 38. The lid support rods 38 are positioned at 90 degrees from one another and are supported at the front of the dispenser by fasteners 39 which are supported at the front wall 28 of the housing and which move with the adjustable lid pager assemblies 54.

A generally circular lid dispensing plate 40 is positioned for axial movement within the supply tube 26. The dispensing plate 40 has four outwardly opening radial slots 42 through which the support rods 38 extend. A cylindrical stabilizing collar 44 extends rearwardly from the dispensing plate 40. The stabilizing collar 44 is slightly smaller in diameter than the supply tube 26, and thus travels freely within the supply tube. The collar 44 prevents the dispensing plate from tipping with respect to the rods 38, and assists in maintaining even pressure on the stack of lids 22.

A coil spring 48 extends between the rear wall 34 of the supply tube 26 and a rectangular spring stop plate 50 mounted to the rear of the dispensing plate 40. The stop plate 50 extends perpendicular to the dispensing plate 40 and bisects the dispensing plate. The stop plate 50 transmits the pressure of the coil spring 48 to the dispensing plate 40, but prevents the spring from interfering with rearwardly protruding rod fasteners 39 as the stack of lids 22 approaches the front wall 28 of the housing. The collar has slots 52 which extend rearwardly adjacert the plate slots 42 which also accommodate the fasteners 39 when the stack of lids is depleted and the dispensing plate is in close proximity to the front wall 28 of the housing.

The radial position of the lid support rods 38 at the rear of the dispenser is controlled by a single dial adjustment of a rear dial 56. The rear dial 56 may be a thin plastic ring with a thickness of approximately 0.375 inches and an outside diameter of approximately 5.625 inches. This size will handle 3 inch to 4 inch diameter lids. A larger dial will be required to handle the 4 inch to 5 inch diameter lid range. The inside diameter of the rear dial ring is approximately 2.875 inches. The outer edge of the dial ring has a continuous 45° peak-and-valley serrated tooth pattern around the full circumference as shown in FIG. 2. The peak to peak distance between the teeth is approximately 0.044 inches with a valley to peak height of approximately 0.022 inches.

The rear dial has four 0.250 inch wide curved blind slots 58. The curved slots may be said to extend along a path which has both a radial component and a circumferential component. The radial component extends from the innermost desired spacing of the support rods to the outermost spacing. The circumferential component corresponds to the degree of rotation desired to achieve the maximum radial displacement of the rods. Each slot is approximately 0.250 inches deep, and, if formed from sheet plastic stock as in the dispenser 20 of FIG. 2, is closed with a backing cover plate 60. The curved slots 58 are positioned to intersect the tube rear wall radial slots 36. A rod 38 which extends through a radial slot 36 into a curved blind slot 58 is thus captured against axial movement, while still being free to move radially when the dial is rotated. The curved blind slots begin about 0.062 inches from the outer edge and end 0.062 inches from the inner edge of the rear dial. The radial position of the center of each slot diminishes from 2.187 inches to 1.687 inches. The slots are approximately 3 inches long and spaced 90° apart, beginning at the 315° mark. Every second peak is indexed consecutively from one to forty-two.

Four sets of inner and outer ring retainer clips 62, 64 are affixed to the supply tube rear wall 34. Four flexible indexing studs 66 are fixed to the tube rear wall 34 to engage with the serrated teeth of the rear dial ring 56. All four outer clips 64 are located such that they nest accurately with the outer edge of the dial ring 56 once it is snapped in position. The outer clip located at 315° has an engraved, raised, or printed indexing line bisecting the center valley positioned on the clip top surface to match indexing on the rear dial ring face.

The rear dial 56 is connected to the rear wall 34 of the lid supply tube 26 by centering the rear dial ring 56 within the inner retainer clips 62 and the outer retainer clips 64 on the rear wall and pressing to deform the protruding tabs of the clips outwardly until the ring 56 snaps into proper position. Each of the lid support rods 38 protrudes through its rear wall 34 slot 36 and into its curved dial ring slot 58. The ring retainer clips will flex out and then snap over the front face of the dial ring to contain the whole assembly. The indexing studs 66 engage with the serrated teeth of the rear dial ring 56, and control rotation of the ring. When rotational pressure is applied to the rear dial ring 56, the indexing studs will flex, allowing the incremental click positioning of the dial and the inward and outward radial movement of the support rods 38. Each click will equal approximately a 0.030 inch change in lid diameter.

The tendency of the stack of lids to twist or "snake" is avoided by the lid stack support arrangement of the dispenser 20. When adjusting the pager assemblies for different diameter lids, the front ends of the rods are adjusted together with the pagers to which they are linked. The back ends of the rods are set at the proper location for the diameter of lid being used by rotation of the dial ring as shown in FIG. 2. Even when the lids are inserted at an angle, the rods tend to straighten them for proper lid feed.

As shown in FIG. 1, four lid restraint members or pagers 82 are pivotably mounted on adjustable arms 68 which extend radially into the space immediately frontward of the lid dispensing opening 30. Pager assemblies 54 are composed of a lid restraint member or pager 82 on an arm 68 with a biasing spring 84. The pagers 82 are similar to those disclosed in my prior U.S. Pat. No. 5,383,571, however, for ease of adjustment, the pager assemblies are mounted between the housing front wall and a front pager dial 72. The rigid arm 68 is positionably fixed to the housing and extends radially inwardly and frontwardly of the housing lid dispensing opening. The pager 82 is pivotably connected to the arm 68. The spring 84 extends between the pager 82 and the arm 68 to bias the pager frontwardly. The pager 82 thus remains fixed with respect to the arm 68 when lids are urged frontwardly against the pager, but the pager pivots rearwardly when a stack of lids is inserted into the dispenser through the-lid dispensing opening.

The pager dial 72 operates in a manner similar to the rear dial. The pager dial 72 is an annular thin plastic ring having four curved through slots 74. The pager dial 72 is about 0.125 inches thick and 0.750 inches wide. The inside diameter is the same as the lid tube inside diameter. The outer edge of the dial ring has a continuous 45° peak and valley toothed serration. Peak to peak distance between teeth is approximately 0.044 inches with a valley to peak height of about 0.022 inches.

The curved front dial slots 74 are spaced 90° apart and are about 0.125 inch wide slots, and about 4.25 inches long. The curved slots 74 begin 0.062 inches from the outside dial ring edge and end 0.062 inches from the inside dial ring edge. One hundred of the outer edge peaks are consecutively numbered for indexing. The front dial ring 72 is held to the housing front wall 28 by four pairs of inner retainer clips 76 positioned at the interior diameter of the ring, and four pairs of exterior retainer clips 78 positioned at the exterior diameter of the ring. Each pager arm 68 is positioned between a pair of inner retainer clips 76 and a pair of exterior retainer clips 78 In addition, a 0.125 inch diameter post 70 is centered on each pager arm 68 and projects frontwardly about 0.093 inches. Each pager 82 is thus positioned with respect to the lid dispensing opening 30 by engagement of the pager posts 70 within the curved slots of the front dial ring 72. Rotation of the front dial ring 72 causes the four pager assemblies 54 to move in unison either radially inwardly or radially outwardly. Four front indexing studs 80 are positioned on the housing front wall to engage the teeth on the exterior periphery of the front dial ring 72. The front indexing studs 80 are somewhat resilient to allow the incremental positioning of the dial ring. One of the studs may be provided with a visible indexing line for reference in adjustment of the front dial. The dial rotates both clockwise and counterclockwise. Each click of the dial is equivalent to 0.010 inches in lid diameter.

The pager assembly 54 is thus readily positioned with respect to the lids 22 in the lid supply tube 26 presented through the dispensing opening 30 to properly engage with the flange of the frontmost lid of the stack. Each pager assembly 54 has a spring-loaded pager 82 which presents a rigid, unyielding lip to the frontmost lid in the stack which is urged frontwardly by the lid dispensing plate 40. However, when loading lids into the supply tube, the pagers pivot rearwardly on the pins, and are returned to their original positions by the springs 84. The torsion springs 84 have noncoiled segments which engage within a bore in the pager arm and with the pager sidewall respectively. To more effectively grip lids, a resilient strip of polyurethane is adhesively attached to the curved pager sidewall.

As shown in FIG. 1, the front support rod fasteners 39 are preferably connected to or integrally formed with the pager arms 68. Each fastener 39 has a semicylindrical rearwardly opening cavity which receives a support rod 38. The fasteners 39 do not fully encircle the support rods 38, thus permitting the lids to be supported on the rods into close proximity to the lid dispensing opening.

In cases where it becomes necessary to remove an entire stack of lids from the supply tube without dispensing individually, each pager may be pivoted frontwardly and the stack removed without interference with the pagers.

The pivotable front door 25 has a dial lid claw assembly 86, shown in FIGS. 1 and 3, which has three lid claws 88 which extend frontwardly from the rear surface of a door cover plate 90 which is affixed to the inside of the door. The radial positions of the lid claws 88 are adjustable in unison by rotation of a claw dial ring 92. The claw dial ring 92 is an annular plate approximately 0.125 inches thick and approximately 3.5 inches in diameter. Its inside diameter is approximately 1.5 inches. The outer edge of the claw dial ring 92 has a continuous 45° peak and valley toothed serration. The peak to peak distance between teeth is approximately 0.044 inches with a valley to peak height of 0.022 inches.

The dial ring has three curved 0.125 inch slots 98 located on its face. The slots 98 begin 0.062 inches from the outer edge and end 0.062 inches from the inner edge. The center of each slot 98 diminishes steadily from a 1.625 inch radius down to a 1.00 inch radius. The length of each slot 98 is approximately 2.125 inches.

Four pairs of ring inner and outer retainer clips 100 are affixed to the door cover plate 90. All four outer ring retainer clips 100 are located such that they engage accurately with the outer edge of the claw dial ring 92. Each claw 88 has a base 94 which extends between the door cover plate and the claw dial ring 92. A post 96 extends upwardly through each curved slot 98. The posts 96 extend from a base 99 retained between the dial ring and the door cover plate. The post bases 99 and the claws 88 are free to move radially, restrained by the slots 98 and a guide track 102 defined in the door cover plate. A resilient rubber band 104 is looped between a post 96 and a nubbin 97 which protrudes from the claw base 94. Rotation of the claw dial ring 92 causes the posts 96 to move radially. The claws 88, being connected to the posts 96 by the resilient bands 104, move with the posts. The bands 104, however, permit the claws 88 to move away from the posts when the claw assembly is closed over a lid 22 in the lid stack.

The claw assembly is assembled by placing three lid claw and stop assemblies on the lid plate. The dial ring is centered on the ring retainer clips and pressed in. Each of the claw posts protrudes into its respective dial ring slot. The ring retainer clips flex out and then over the front face of the dial ring to contain the whole assembly. Indexing studs 101 engage with peak and valley serrations on the exterior of the claw ring control dial movement. Each click equals 0.020 inches change in lid diameter.

When the pivotable door 25 is closed on the housing 24, the claw assemblies, as shown in FIG. 1, are positioned directly below the lids, and on either side of the lid. Two springs 106 extend between the door 25, at a position immediately below the claw dial ring 92, and the front wall 28 of the housing 24. The springs 106 bias the door 25 in a closed position. Two catches 108 extend rearwardly from the door 25 on either side of the claw dial ring 92. The catches 108 have portions which protrude sidewardly to engage with horizontal steps 110 projecting from a shield 112 which extends frontwardly from the housing front wall 28. The catches 108 are positioned so that a user pulling down on a handle 114 will cause the door 25 to pivot partially open, and thereby present a lid 22 clasped between the claws for upward removal by a user. When the user releases the door the springs cause it to snap closed, driving the claws over the flange of the next lid in the stack. When the next user opens the door, a lid will again be presented for removal.

To load a new stack of lids the door is pivoted to the partially opened, lid-removal position, and the catches 108 are depressed towards one another so that they no longer engage with the steps 110, thereby allowing the door to open to the fully open position shown in FIG. 1, allowing the unimpeded insertion of lids.

In the dispenser 20, dial adjustment at three locations on the lid dispenser eliminates the need to pre-adjust units prior to shipping or to ship a pre-adjusted lid kit in the field. Dial adjustment is provided for the lid pagers on the lid tube face, the lid claws located on the door, and the lid guide rods on the rear of the lid tube. These arrangements simplify adjustment, while at the same time minimizing the total number of parts required for a dispenser.

Hence an operator of the lid dispenser 20 need only load the lids into the four support rods, then adjust the front and rear dials until the lids are freely but closely supported and the pagers are properly engaging the lids to remove one at a time for best dispensing. The claws may be provided with a plurality of offset holes, for example three rows of three, which allow the individual claw stops to be removed and reinserted in the desired spot for accurate extraction. Alternatively, the claws may be threaded so the stops may be adjusted with simple hand positioning.

The complete adjustability of the dispenser 20 permits it to be used for dispensing lids of a wide range of sizes. Typically a dispenser might be called on to dispense lids for beverage containers from eight fluid ounces to forty-four fluid ounces. Whenever it is desired to load the lid dispenser with a new type or size of lids, the operator need only make a few adjustments. The rear dial is rotated to bring the support rods into position; the front dial is adjusted to bring the pagers into position; the door dial is adjusted to bring the extractor claws into position, and the depth stops are adjusted to suit the lid thickness. Once set, the adjustments need not be interfered with until it is desired to load the dispenser with a different type of lid. Lid dimensions vary not only with respect to size of container, but also from manufacturer to manufacturer.

It should be noted that although the dispenser 20 has been illustrated as a stand-alone housing unit, it may also be fitted within a cabinet, in which case the cabinet will function as the housing for the dispenser. Furthermore, although certain plastic elements of the dispenser have been illustrated as being fabricated from transparent plastic, opaque plastic may also be used. Although the claw assembly has been disclosed as employing separate post and claw elements, with a resilient band connecting the two, a single claw element with an integral base may be used, eliminating the resilient band and instead relying on the resiliency of the claw itself Furthermore, although the dial slots have been discussed as strictly arcuate, other paths which have both a radial and a circumferential component may be employed, for example inclined slots.

It is understood that the invention is not limited to the particular construction and arrangement of parts herein illustrated and described, but embraces such modified forms thereof as come within the scope of the following claims.

I claim:

1. An apparatus for dispensing container lids, the apparatus comprising:
   a housing having portions defining a lid dispensing opening;
   a plurality of lid support rods which extend axially within the housing;
   a biasing member mounted on the support rods for engaging lids and urging them toward the lid dispensing opening, wherein the housing has portions positioned rearwardly of the biasing member which define a plurality of radially extending slots, wherein each rod extends into one of said radial slots; and
   a rear ring rotatably connected to the housing adjacent said radial slots and having portions defining a plurality of second slots which extend with a circumferential component, such that rotation of the rear ring causes the rods to move radially in unison, to thereby permit the convenient adjustment of the spacing of the support rods to accommodate different diameter lids.

2. The apparatus of claim 1 wherein the rear ring has a serrated toothed exterior perimeter, and further comprising at least one indexing stud fixed to the housing to resiliently engage the toothed exterior of the rear ring, such that rotation of the rear ring permits incremental positionable displacement of the rear ring and the engaged lid support rods.

3. The apparatus of claim 1 further comprising:
   a plurality of lid restraint members positioned frontward of the lid dispensing opening to engage lids in the stack; and
   a rod connector which extends rearwardly from each lid restraint member, wherein each support rod extends from a radial slot to a rod connector, and wherein the lid restraint members and the rod connectors are movable radially outwardly to adjust the lid support rod spacing to accommodate lids of different dimensions.

4. The apparatus of claim 3 further comprising:
   a front dial ring mounted for rotation to the housing to surround the lid dispensing opening, the front dial ring having a plurality of slots therein which extend from a radially inward position to a radially outward position; and
   portions of each lid engaging member which extend into a front dial ring slot, the lid engaging members being supported for radial displacement to the housing, such that rotation of the front dial ring causes the radial displacement of the lid engaging members and the connected lid support rods.

5. The apparatus of claim 1 further comprising:
   a door positioned frontwardly of the lid dispensing opening, the door being pivotably mounted to the housing to pivot between a first position which covers the lid dispensing opening, to a second position which allows access to the interior of the door; and
   a claw assembly mounted to the interior of the door, the claw assembly having a plurality of claws which in the door first position engage with a lid in the lid stack, and which in the door second position extract said engaged lid and present it for removal by a user.

6. The apparatus of claim 5 wherein the claw assembly comprises:
   at least three claws, each mounted in slots for radial displacement along the door;
   a claw dial ring rotatably mounted to the door and having second slots which have a radial component and a circumferential component, wherein each of the at least three claws has portions which extend into one of the second slots, wherein rotation of the claw dial ring simultaneously adjusts the radial position of the three claws.

7. The apparatus of claim 6 wherein the claw dial ring has a serrated toothed exterior perimeter, and further comprising at least one indexing stud fixed to the door to resiliently engage the toothed exterior of the claw dial ring, such that rotation of claw dial ring permits incremental positionable displacement of the claw dial ring and the linked claws.

8. The apparatus of claim 1 wherein the housing has a rearwardly extending tube, and wherein the support rods extend through the tube, and wherein the biasing member comprises:
   a lid dispensing plate which engages the stack of lids and travels axially within the tube; and
   a spring which extends between a rear portion of the housing and the lid plate.

9. The apparatus of claim 1 wherein the lid plate has portions defining a plurality of slots through which the lid support rods extend, and wherein a collar extends rearwardly from the lid plate within the tube, the collar being dimensioned to engage the tube and prevent over-tilting of the lid plate.

10. The apparatus of claim 1 wherein each second slot describes a substantially arcuate path.

11. An apparatus for dispensing container lids, the apparatus comprising:
    a housing having portions defining a lid dispensing opening;
    a support for a stack of lids positioned within the housing to discharge lids at the lid dispensing opening;
    a front ring positioned around the lid dispensing opening, the front ring having a plurality of slots therein which have a component which extends radially and a component which extends peripherally;
    a plurality of lid restraint members which extend from the housing frontwardly of the lid dispensing opening and engage with a frontmost lid of the stack, wherein portions of each lid restraint member extend into one of said slots, the lid restraint members being supported on the housing for radial displacement, such that rotation of the front ring causes the simultaneous radial displacement of the lid restraint members for adjustable engagement with lids contained in the stack;

a rigid arm positionably fixed to the housing and extending radially inwardly and frontwardly of the housing lid dispensing opening, wherein the lid restraint member is pivotably connected to the arm; and a spring which extends between the lid restraint member and the arm, wherein the lid restraint member is biased frontwardly by the spring, such that the lid restraint member remains fixed with respect to the arm when lids are urged frontwardly against the lid restraint member, but the lid restraint member pivots rearwardly when a stack of lids is inserted into the apparatus through the lid dispensing opening.

12. An apparatus for dispensing container lids, the apparatus comprising:

a housing having portions defining a lid dispensing opening;

a support for a stack of lids positioned within the housing to discharge lids at the lid dispensing opening;

a front ring positioned around the lid dispensing opening, the front ring having a plurality of slots therein which have a component which extends radially and a component which extends peripherally;

a plurality of lid restraint members which extend from the housing frontwardly of the lid dispensing opening and engage with a frontmost lid of the stack, wherein portions of each lid restraint member extend into one of said slots, the lid restraint members being supported on the housing for radial displacement, such that rotation of the front ring causes the simultaneous radial displacement of the lid restraint members for adjustable engagement with lids contained in the stack;

portions of the housing rearward of the front ring which define a plurality of radially extending slots;

a plurality of lid support rods which extend from the lid restraint members to the radial slots; and a rear ring rotatably connected to the housing adjacent said radial slots and having portions defining a plurality of second slots which extend with a circumferential component, such that rotation of the rear ring causes the rods to move radially in unison, to thereby permit the convenient adjustment of the spacing of the support rods to accommodate different diameter lids.

13. An apparatus for dispensing container lids, the apparatus comprising:

a housing having portions defining a lid dispensing opening;

a support for a stack of lids positioned within the housing to discharge lids at the lid dispensing opening;

a front ring positioned around the lid dispensing opening, the front ring having a plurality of slots therein which have a component which extends radially and a component which extends peripherally;

a plurality of lid restraint members which extend from the housing frontwardly of the lid dispensing opening and engage with a frontmost lid of the stack wherein portions of each lid restraint member extend into one of said slots, the lid restraint members being supported on the housing for radial displacement, such that rotation of the front ring causes the simultaneous radial displacement of the lid restraint members for adjustable engagement with lids contained in the stack;

a door positioned frontwardly of the lid dispensing opening, the door being pivotably mounted to the housing to pivot between a first position which covers the lid dispensing opening, to a second position which allows access to the interior of the door; and a claw assembly mounted to the interior of the door, the claw assembly having a plurality of claws which in the door first position engage with a lid in the lid stack, and which in the door second position extract said engaged lid and present it for removal by a user.

14. The apparatus of claim 13 wherein the claw assembly comprises:

at least three claws, each mounted in a slot for radial displacement along the door;

a claw dial ring rotatably mounted to the door and having a second slot which has a radial component and a circumferential component; and portions of each claw which extend into the second slot, wherein rotation of the claw dial ring simultaneously adjusts the radial position of the three claws.

15. An apparatus for dispensing container lids comprising;

a housing having portions which support a stack of lids;

a biasing member disposed between the housing and the stack, wherein the biasing member urges the stack frontwardly;

a door pivotably mounted to the housing, the door being pivotable between a closed position, and an open position;

a plurality of claw assemblies mounted to the door, wherein each claw assembly has a base which is slidably retained in relation to a ring which is rotatably connected to the door, the ring having a plurality of slots therein, portions of each claw assembly engaging within one of said plurality of slots in the ring, the slots extending radially and peripherally, such that rotation of the ring causes the simultaneous radial displacement of the claws, said simultaneous adjustment permitting the rapid and convenient reconfiguration of the claw assemblies to engage lids of different dimensions.

16. An apparatus for dispensing individual container lids, the apparatus comprising:

a housing which supports a stack of lids, wherein portions of the housing define a lid dispensing opening;

a door which is pivotably mounted to the housing, the door being pivotable between a first position in which the door covers and blocks access to the lid dispensing opening, and a second position in which the door is tilted outwardly from the lid dispensing opening; and a claw assembly mounted to the door, the claw assembly having a plurality of claws, wherein displacement of the door to the first position causes the claws to engage with a single lid in the stack retained within the housing and wherein pivoting the door outwardly into the second position removes said engaged single lid from the stack and presents it for removal by a user, wherein the door is biased in the first closed position by at least one spring extending between the door and the housing, and wherein at least one catch extends rearwardly from the door, the catch having portions which protrude sidewardly to engage with a step portion of the housing, the catch being positioned to restrict pivotable displacement of the door beyond the second position by engaging with the step portion, and wherein the catch may be depressed to no longer engage the step portion to permit pivoting of the door to a third position more fully open than the second position, the door in the third position permitting loading of the apparatus with a stack of lids.

* * * * *